United States Patent
Kim et al.

(10) Patent No.: US 8,666,175 B2
(45) Date of Patent: Mar. 4, 2014

(54) METHOD AND APPARATUS FOR DETECTING OBJECTS

(75) Inventors: Jung-bae Kim, Hwaseong-si (KR);
Seong-deok Lee, Suwon-si (KR);
Jong-ha Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1409 days.

(21) Appl. No.: 12/078,737

(22) Filed: Apr. 3, 2008

(65) Prior Publication Data

US 2010/0284622 A1 Nov. 11, 2010

(30) Foreign Application Priority Data

Nov. 23, 2007 (KR) .......................... 10-2007-0120357

(51) Int. Cl.
*G06K 9/62* (2006.01)

(52) U.S. Cl.
USPC ............ 382/227; 382/118; 382/190; 382/286

(58) Field of Classification Search
USPC ......... 382/224–228, 190, 195, 199, 201, 203, 382/286, 118
See application file for complete search history.

(56) References Cited

U.S. PATENT DOCUMENTS

| 7,020,337 | B2 | 3/2006 | Viola et al. | |
| 7,099,510 | B2 | 8/2006 | Jones et al. | |
| 2005/0013479 | A1 | 1/2005 | Xiao et al. | |
| 2005/0180627 | A1 | 8/2005 | Yang et al. | |
| 2005/0220336 | A1 * | 10/2005 | Sabe et al. | 382/159 |
| 2006/0120604 | A1 | 6/2006 | Kim et al. | |
| 2007/0201747 | A1 * | 8/2007 | Yamada et al. | 382/199 |
| 2008/0175447 | A1 | 7/2008 | Kim et al. | |
| 2010/0272363 | A1 * | 10/2010 | Steinberg et al. | 382/190 |

FOREIGN PATENT DOCUMENTS

| JP | 2005-284348 | 10/2005 |
| KR | 10-2006-0064974 | 6/2006 |
| KR | 10-2006-0080284 | 7/2006 |
| KR | 10-2008-0069878 | 7/2008 |

OTHER PUBLICATIONS

Korean Notice of Allowance issued Nov. 28, 2013 in corresponding Korean Application No. 10-2007-0120357.

* cited by examiner

*Primary Examiner* — Brian Q Le
*Assistant Examiner* — Michael Vanchy, Jr.
(74) *Attorney, Agent, or Firm* — Staas & Halsey LLP (57) ABSTRACT

A method and apparatus for detecting an object are provided. The method calculates a feature value based on features extracted from an input image by using a classifier of an $i_{th}$ stage, compares the calculated feature value with a first threshold value of the $i_{th}$ stage, compares the feature value with a second threshold value of the $i_{th}$ stage according to a result of the comparison between the feature value and the first threshold value of the $i_{th}$ stage, and jumps to a classifier of an $i+2_{th}$ stage according to a result of the comparison between the feature value and the second threshold value of the $i_{th}$ stage. By doing so, the method can avoid repeated calculations and can rapidly detect the object in the input image.

9 Claims, 7 Drawing Sheets

METHOD AND APPARATUS FOR DETECTING OBJECTS

CROSS-REFERENCE TO RELATED APPLICATIONS

This application claims the benefit of Korean Patent Application No. 10-2007-0120357, filed on Nov. 23, 2007, in the Korean Intellectual Property Office, the disclosure of which is incorporated herein in its entirety by reference.

BACKGROUND

1. Field

One or more embodiments of the present invention relate to a method and an apparatus for detecting an object, and more particularly, to a method and an apparatus for detecting an object, particularly a face, using a multi-stage classifier.

2. Description of the Related Art

As society develops into an advanced information society, there is increasing consumer demand for goods and services in fields such as information security and customer management. Accordingly, the present inventors have determined that a reliable system for identifying a particular manager and for securing visitors is required.

Recently, face recognition methodology has received much publicity. Face recognition methods are widely used in not only the above-mentioned types of security systems but also in face detection fields such as inspection, customer management in a large mall, individual personal protection, unmanned vending machines, etc., and in various other fields that use a computer's information processing ability and a wide area communication network including the Internet.

Face detection technology is one of the basic technologies applied to various fields including digital contents management, face recognition, three-dimensional face modeling, animation, avatars, smart surveillance, digital entertainment, and the like. In this regard, face detection technology is becoming increasingly important.

Rapid object detection technology is widely used in fields requiring rapid face detection, for example, 3A (automatic exposure; AE, auto white balance; AWB, automatic focusing; AF) cameras based on face detection, automated teller machines (ATM), digital video recorders (DVR) based on face detection, face recognition phones, face-based photo album classification and face-based photo album retrieval, and the like.

Recently, various studies regarding face detection technology have been carried out. However, detection reliability of an algorithm used in the face detection technology is not sufficient to be applied in real life and a desirable detection speed is not possible. In order to solve the aforementioned problems, research into a method of learning a decision boundary from a face sample pattern and using the decision boundary in face detection is being carried out.

A conventional rapid object detection technology extracts a feature from an input image and consecutively proceeds through stages while discarding an input which does not have an object feature sufficient for a multi-classifier based on a cascade structure. Otherwise, the conventional rapid object detection technology sequentially proceeds through a classification calculation operation in a classifier based on a cascade structure while classifying not only inputs having insufficient object features but also inputs having sufficient object features into an object.

However, the described conventional technologies have to calculate an input image in all stages and have to proceed to a considerably advanced stage even for an input having an insufficient object feature, resulting in a significant amount of unnecessary calculation.

SUMMARY

One or more embodiments of the present invention provide a method and an apparatus that can avoid repeated calculations and can rapidly detect an object in an input image by employing a structure in which a stage can be jumped in a general multi-stage classifier.

Additional aspects and/or advantages will be set forth in part in the description which follows and, in part, will be apparent from the description, or may be learned by practice of the invention.

According to an aspect of the present invention, there is provided a method of detecting an object in an input image by using a multi-stage classifier, the method including the operations of calculating a feature value based on features extracted from the input image using a classifier of an $i_{th}$ (i is a positive integer) stage, and comparing the calculated feature value with a first threshold value of the $i_{th}$ stage; comparing the feature value with a second threshold value of the $i_{th}$ stage according to a result of the comparison between the calculated feature value and the first threshold value of the $i_{th}$ stage; and jumping to a classifier of an $i+2_{th}$ stage according to a result of the comparison between the calculated feature value and the second threshold value of the $i_{th}$ stage.

According to another aspect of the present invention, there is provided an object detection apparatus for detecting an object in an input image by using a multi-stage classifier, the object detection apparatus including an object classification unit comprising the multi-stage classifier which calculates a feature value based on features extracted from the input image using a classifier of an $i_{th}$ (i is a positive integer) stage, and compares the calculated feature value with a first threshold value of the $i_{th}$ stage, which compares the feature value with a second threshold value of the $i_{th}$ stage according to a result of the comparison between the calculated feature value and the first threshold value of the $i_{th}$ stage, and which jumps to a classifier of an $i+2_{th}$ stage according to a result of the comparison between the calculated feature value and the second threshold value of the $i_{th}$ stage; and a determination unit determining whether the object exists in the input image, based on a result of the classification performed by the object classification unit.

According to another aspect of the present invention, there is provided a recording medium having recorded thereon a program for executing the method on a computer.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to the like elements throughout. Embodiments are described below to explain the present invention by referring to the figures.

Figure 1:
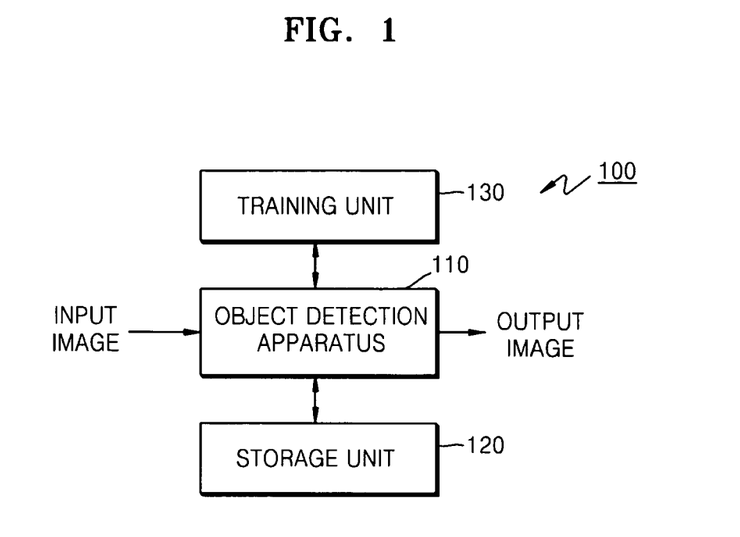
FIG. 1 illustrates an object detection system, according to an embodiment of the present invention.

FIG. 1 illustrates an object detection system 100, according to an embodiment of the present invention.

Referring to FIG. 1, the object detection system 100 may include, for example, an object detection apparatus 110, a storage unit 120, and a training unit 130.

The object detection system 100 detects instances of an object in an input image. Here, the instances refer to categories of predetermined objects, and the object may be included in categories such as a face, a tree, a car, and the like. The input image is a digital image configured with pixels, that is, a bit unit based on a picture image, a video image, an image generated by a computer, or other digital images. An output image output from the object detection system 100 represents detected object instances.

Also, the input image may be divided into subwindows, each having a predetermined size, and may be input to the object detection system 100. For example, the subwindow used to divide the input image may have a size corresponding to a 24×24 pixel.

The object detection apparatus 110 detects a predetermined object instance in the input image and may be configured with a software program, hardware, firmware, a module, and the like. In the current embodiment of the present invention, the object detection apparatus 110 detects the object instance in the input image using a multi-stage classifier. A detailed configuration of the object detection apparatus 110 will be described later in relation to FIG. 2. The storage unit 120 is a data storage device connected to the object detection apparatus 110 and stores the input image, an image being processed, the output image, and the like.

The training unit 130 trains classifiers of all stages included in the object detection apparatus 110. The training unit 130 trains the classifiers before a detection operation is actually performed, by using not only negative samples regarding whether an input image is an object or not, but also by using training data sets including several images including commonly known object instances.

Figure 2:
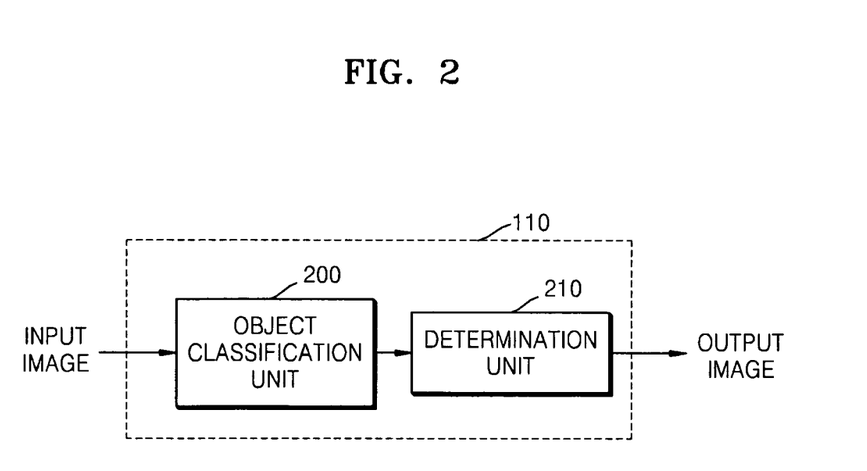
FIG. 2 illustrates an object detection apparatus of FIG. 1, according to an embodiment of the present invention.

FIG. 2 illustrates the object detection apparatus 110 of FIG. 1, according to an embodiment of the present invention.

Referring to FIG. 2, the object detection apparatus 110 may include, for example, an object classification unit 200 and a determination unit 210.

The object classification unit 200 includes multi-stage classifiers, calculates a feature value based on features extracted from an input image using a classifier of an $i_{th}$ stage, and compares the calculated feature value with a first threshold value of the $i_{th}$ stage. Here, the features are used to avoid calculating the input image using a pixel unit, so as to increase a calculation speed. The commonly known features used for the object detection may be a Haar feature, a Gabor wavelet feature, and various rectangular features.

Also, according to a result of the comparison between the feature value and the first threshold value of the $i_{th}$ stage, the feature value is compared with a second threshold value of the $i_{th}$ stage. According to a result of the comparison between the feature value and the second threshold, value of the $i_{th}$ stage jumps to a classifier of an $i+2_{th}$ stage.

Here, the first threshold value of the $i_{th}$ stage is a reference value, that is, a negative threshold value $T_i''$ by which the input image is classified into a negative class, and the second threshold value is a reference value, that is, a jump threshold value $T_i^j$ by which the feature value jumps to the $i+2_{th}$ stage so that the feature value of the input image is not calculated in a classifier of an $i+1_{th}$ stage.

In the current embodiment of the present invention, when the feature value is smaller than the first threshold value of the $i_{th}$ stage, the object classification unit 200 classifies the input image corresponding to the feature value into a non-object. When the feature value is greater than the negative threshold value $T_i''$ of the $i_{th}$ stage, the object classification unit 200 compares the feature value with the jump threshold value $T_i^j$ of the $i_{th}$ stage. As a result of the comparison, when the feature value is greater than the jump threshold value $T_i^j$ of the $i_{th}$ stage, the feature value jumps to the classifier of the $i+2_{th}$ stage, and when the feature value is smaller than the jump threshold value $T_i^j$ of the $i_{th}$ stage, the feature value moves to the classifier of the $i+1_{th}$ stage.

On the contrary, for example, when the feature value is smaller than the negative threshold value $T_i''$ of the $i_{th}$ stage, the object classification unit 200 compares the feature value with the jump threshold value $T_i^j$ of the $i_{th}$ stage. As a result of the comparison, when the feature value is smaller than the jump threshold value $T_i^j$ of the $i_{th}$ stage, the feature value jumps to the classifier of the $i+2_{th}$ stage, and when the feature value is greater than the jump threshold value $T_i^j$ of the $i_{th}$ stage, the feature value moves to the classifier of the i+1th stage. The previously described function of the object classification unit 200 is well known to one of ordinary skill in the art.

The determination unit 210 determines whether a predetermined object exists in the input image, based on the classification result from the object classification unit 200. That is, whether a final object exists in the input image is determined according to the result regarding the object or the non-object, which are classified in each stage based on the feature value of the input image or the feature value of the subwindow of the input image.

Figure 3A:
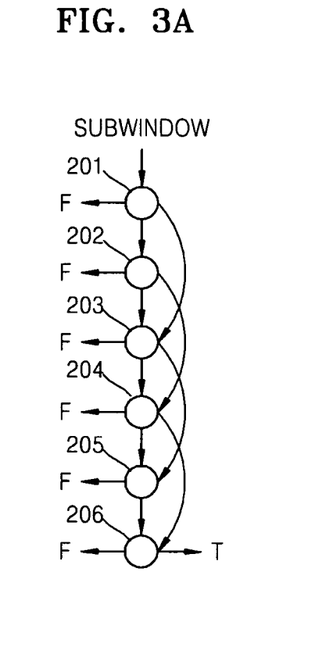
FIGS. 3A through 3C illustrate object detection using a multi-threshold value and a multi-stage classifier, according to an embodiment of the present invention.
Figure 3B:
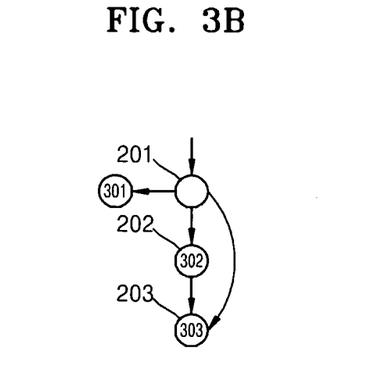
Figure 3C:
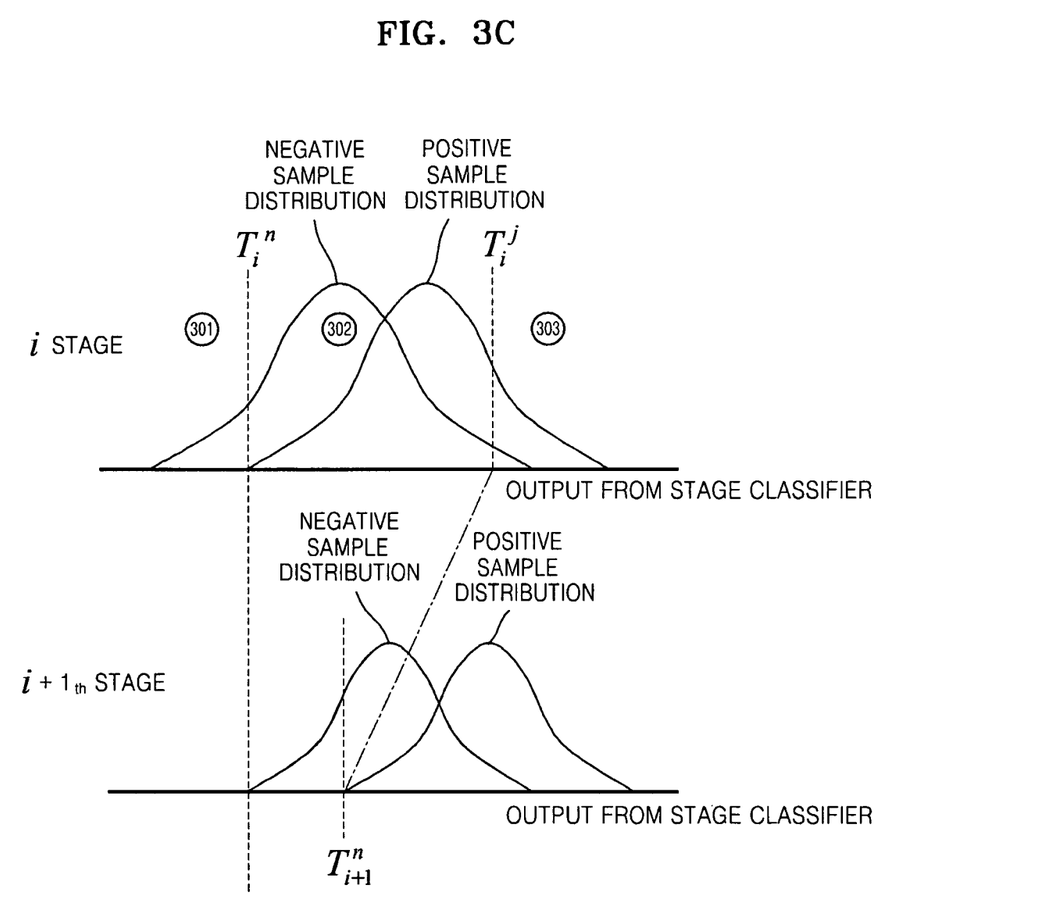

FIGS. 3A through 3C illustrate object detection using a multi-threshold value and a multi-stage classifier, according to an embodiment of the present invention.

FIG. 3A represents the multi-threshold value and the multi-stage classifier according to the current embodiment of the present invention.

Referring to FIG. 3A, classifiers of an $i_{th}$ stage through an $i+5_{th}$ stage (201 through 206) are illustrated. Two threshold values, which are a negative threshold value and a jump threshold value, exist in each of the $i_{th}$ stage through the $i+5_{th}$ stage (201 through 206). Here, F represents that an input image or a subwindow, which are input to a classifier of a current stage, is compared with a negative threshold value and classified into a non-object according to a result of the comparison. T represents that the input image or the subwindow is classified into an object in a last stage.

Referring to FIG. 3B, when the subwindow obtained by dividing the input image is input to the classifier 201 of the $i_{th}$ stage, a feature value is calculated using a feature extracted from the subwindow. An input having a feature value smaller than a negative threshold value $T_i''$ is classified into a non-object (a region 301). Also, inputs jump directly to an $i+2_{th}$ stage (a region 303), wherein the inputs are from among inputs that are not classified into the non-object in a current stage, i.e., the $i_{th}$ stage, and wherein the inputs are not classified into the non-object even in a next stage, i.e., an $i+1_{th}$ stage. That is, an input having a feature value of an input image greater than a jump threshold value $T_i^j$ jumps to a stage after the next stage, i.e., to a classifier 203 of the $i+2_{th}$ stage. Accordingly, only a region 302 is calculated in the next stage, i.e., the $i+1_{th}$ stage so that the amount of calculations in the $i+1_{th}$ stage may be reduced.

Referring to FIG. 3C, each of stage classifier outputs of negative samples and positive samples in each of the $i_{th}$ stage and the $i+1_{th}$ stage is illustrated. In the $i_{th}$ stage, only the negative samples exist in the region 301, which is smaller than the negative threshold value $T_i^n$. That is, since there is a great probability that the feature value of the subwindow input to the classifier may be a non-object, the region 301 is classified into a non-object. Also, the region 303, which is greater than the jump threshold value Tij in the ith stage, is a region which cannot be classified into a non-object even in the $i+1_{th}$ stage. Therefore, the region 303 jumps to the stage after the next stage, i.e., to the $i+2_{th}$ stage, without being calculated in the $i+1_{th}$ stage. Such a jump threshold value $T_i^j$ is determined from a negative threshold value $T_{i+1}^n$ of the $i+1_{th}$ stage, as illustrated in FIG. 3C.

The jump threshold value $T_i^j$ of the $i_{th}$ stage is determined from a learning database generated in the $i+1_{th}$ stage, using a backward learning method. That is, negative samples classified into the non-object in the $i+1_{th}$ stage are collected. In other words, outputs which are from a classifier of the $i+1_{th}$ stage and which are smaller than the negative threshold value $T_{i+1}^n$ of the $i+1_{th}$ stage, that is, samples corresponding to $h_{i+1}(x)$ are collected as illustrated in Equation 1. Then, as illustrated in Equation 2, the collected samples are input to the classifier of the $i_{th}$ stage, and a maximum value of an output from the classifier is determined as a jump threshold value.

Also, when the jump threshold value is determined, there is a chance that the jump threshold value may become too great due to a long tail caused by outliers of negative sample sets. Thus, the jump threshold value may be determined, with outliers in some of the top in $|an|_{[S-n-H1]}$ entire distribution excluded. The jump threshold value illustrated in FIG. 3C according to the current embodiment of the present invention is determined, with outliers in the top 1 through 3% of the three negative samples excluded.

$$Q_{i+1} = \{x | h_{i+1}(x) < T_{i+1}^n\} \text{ where } x \in N_{i+1} \quad \text{Equation 1}$$

$$T_i^j = \max[h_i(q)] \text{ where } q \in Q_{i+1} \quad \text{Equation 2:}$$

Here, $N_{i+1}$ represents the three negative samples of the $i+1_{th}$ stage, $h_i$ represents the classifier of the $i_{th}$ stage, $T_i^n$ represents the negative threshold value of the $i_{th}$ stage, and $T_i^j$ represents the jump threshold value of the $i_{th}$ stage.

Here, the negative threshold value $T_i^n$ may be determined using a conventional AdaBoost learning method which can be understood by referring to U.S. Pat. No. 7,099,510, entitled "Rapid Object Detection using a Boosted Cascade of Simple Features" by Viola and Jones.

Thus, the region 303 illustrated in FIG. 3C does not have to be calculated in the $i+1_{th}$ stage so that an object detection speed may be increased.

Figure 4A:
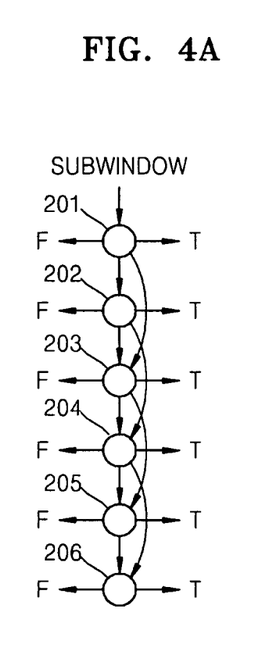
FIGS. 4A through 4C illustrate object detection using a multi-threshold value and a multi-stage classifier, according to another embodiment of the present invention.
Figure 4B:
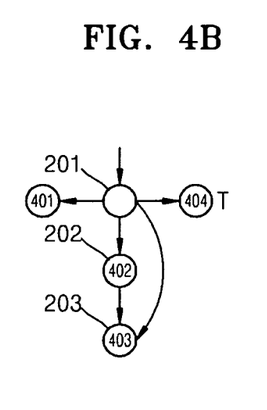
Figure 4C:
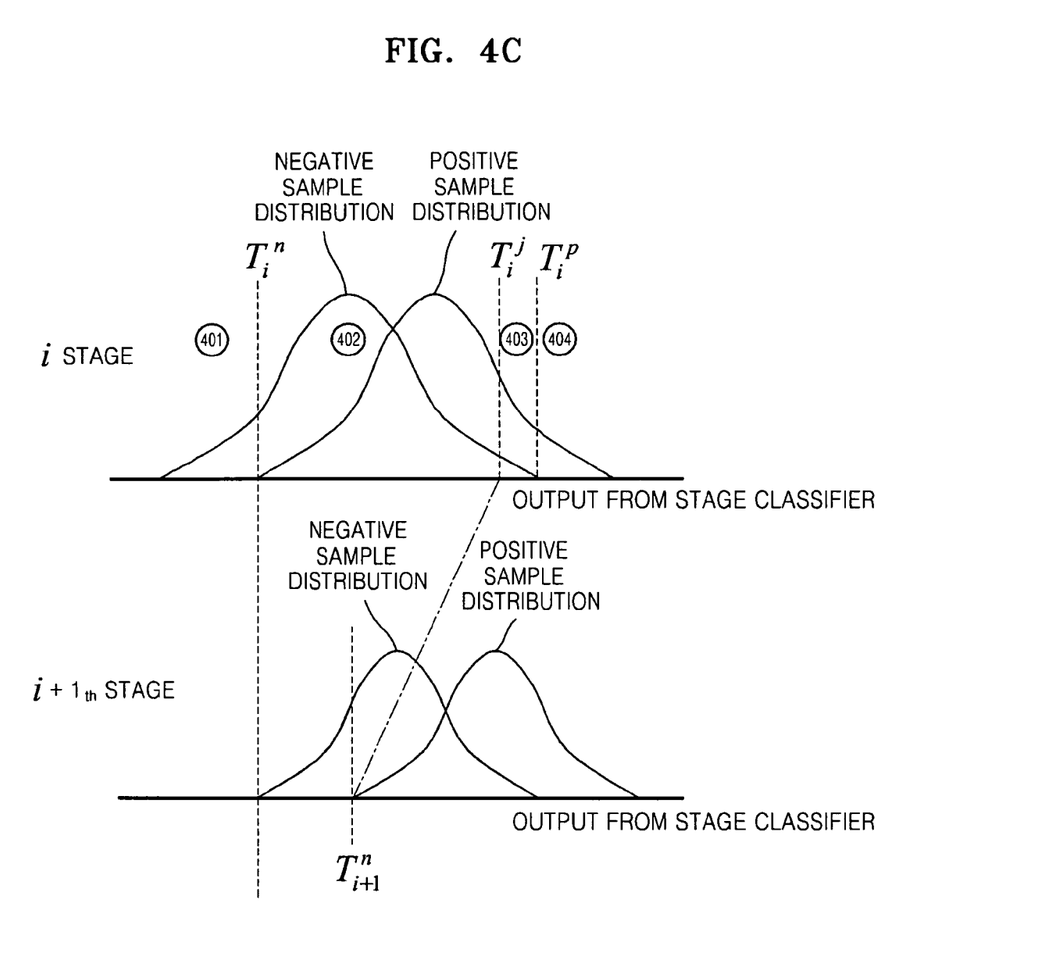

FIGS. 4A through 4C illustrate object detection using a multi-threshold value and a multi-stage classifier, according to another embodiment of the present invention.

FIG. 4A represents the multi-threshold value and the multi-stage classifier, according to the current embodiment of the present invention.

Referring to FIG. 4A, classifiers of an $i_{th}$ stage through an $i+5_{th}$ stage (201 through 206) are illustrated. Three threshold values, which are a negative threshold value, a positive threshold value, and a jump threshold value exist in each of the $i_{th}$ stage through the $i+5_{th}$ stage (201 through 206). Here, F represents that an input image or a subwindow, which is input to a classifier of a current stage, is compared with a negative threshold value $T_i^n$ and classified into a non-object according to a result of the comparison. T represents that the input image or the subwindow, which is input to the classifier of the current stage, is compared with a positive threshold value $T_i^p$ and classified into an object according to a result of the comparison.

Referring to FIG. 4B, when the subwindow obtained by dividing the input image is input to a classifier 201 of the $i_{th}$ stage, a feature value is calculated using a feature extracted from the subwindow. An input having a feature value smaller than the negative threshold value $T_i^n$ is classified into a non-object (a region 401). Inputs having a feature value greater than the positive threshold value $T_i^p$ are classified into an object (a region 404). Also, inputs jump directly to an $i+2_{th}$ stage (a region 403), wherein the inputs are from among inputs which are not classified into the non-object in a current stage, i.e., the $i_{th}$ stage, and wherein the inputs are not classified into the non-object even in a next stage, i.e., an $i+1_{th}$ stage. That is, an input having a feature value of an input image greater than the jump threshold value $T_i^j$ jumps to a stage after the next stage, i.e., to a classifier 203 of the $i+2_{th}$ stage. Accordingly, only a region 402 is calculated in the next stage, i.e., the $i+1_{th}$ stage.

Referring to FIG. 4C, each of the stage classifier outputs of negative samples and positive samples in each of the $i_{th}$ stage and the $i+1_{th}$ stage are illustrated. In the $i_{th}$ stage, only the negative samples exist in the region 401 which is smaller than the negative threshold value $T_i^n$. That is, since there is a great probability that the feature value of the subwindow input to the classifier may be the non-object, the region 401 is classified into the non-object. Also, only the positive samples exist in the region 404 in which the feature value is greater than the positive threshold value $T_1^p$. That is, since there is a great probability that the feature value of the subwindow input to the classifier may be an object, the region 404 is classified into the object. Also, the region 403, which is greater than the jump threshold value $T_i^j$ in the $i_{th}$ stage, is a region which cannot be classified into the non-object even in the $i+1_{th}$ stage. Therefore, the region 403 jumps to the stage after the next stage, i.e., to the $i+2_{th}$ stage, without being calculated in the $i+1_{th}$ stage. The description regarding such a jump threshold value $T_i^j$ is the same as that described in relation to FIG. 3C.

Here, the positive threshold value $T_i^p$ is determined from a learning database of the $i_{th}$ stage, using a forward learning method. That is, as illustrated in Equation 3, three learned negative samples are input to the classifier of the $i_{th}$ stage so that a maximum value thereof is determined as a positive threshold value.

$$T_i^p = \max[h_i(x)] \text{ where } x \in N_i \quad \text{Equation 3:}$$

Here, $N_i$ represents the three negative samples of the $i_{th}$ stage, $h_i$ represents the classifier of the $i_{th}$ stage, and $T_1$ represents the positive threshold value of the $i_{th}$ stage.

Referring back to FIG. 4C, the region 403 is not required to be calculated in the $i+1_{th}$ stage, and the region 404 is not required to be calculated in next stages, i.e., the $i_{th}$ stage through the $i+5_{th}$ stage so that an object detection speed may be increased.

Figure 5:
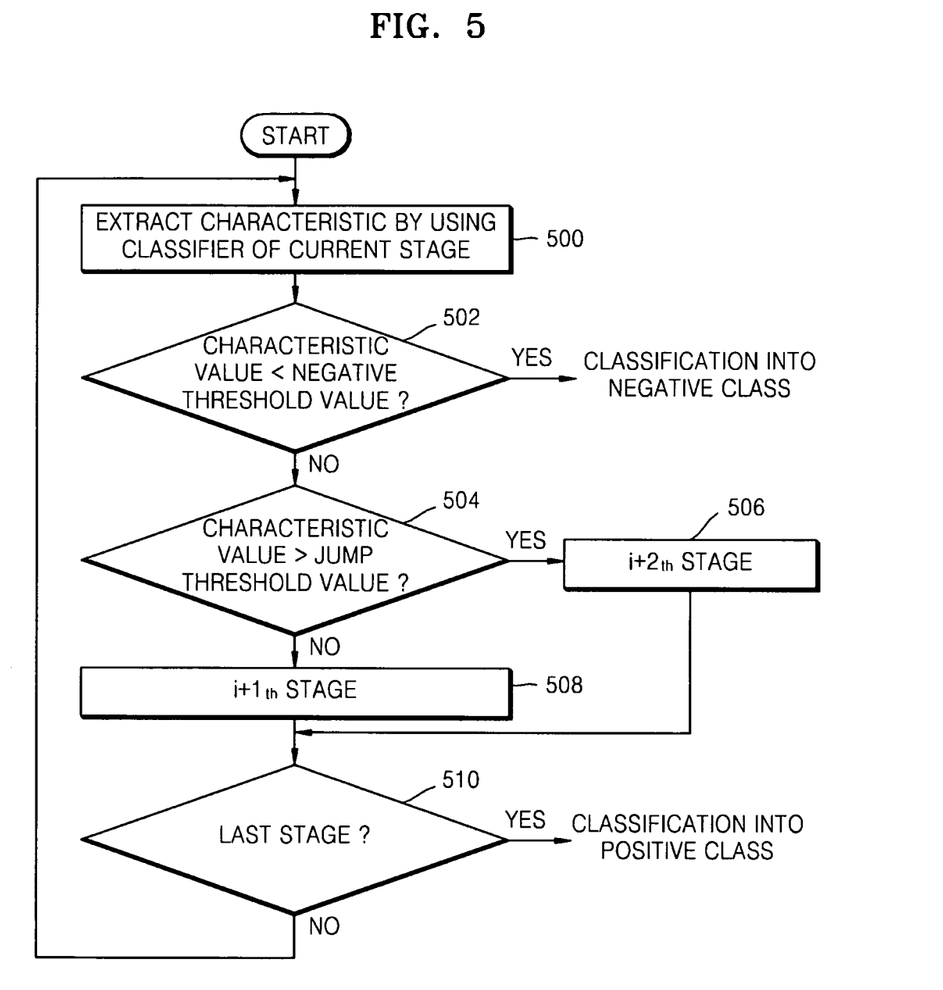
FIG. 5 illustrates a method of detecting object using a multi-stage classifier as illustrated in FIGS. 3A through 3C, according to an embodiment of the present invention.

FIG. 5 illustrates a method of detecting an object using a multi-stage classifier as illustrated in FIGS. 3A through 3C, according to an embodiment of the present invention.

Referring to FIG. 5, in operation 500, a feature is extracted using a classifier of a current stage, i.e., an $i_{th}$ stage. In operation 502, a feature value is calculated using the extracted feature, and the feature value is compared with a negative threshold value. That is, when the feature value is smaller than the negative threshold value, an input image corresponding to the feature value is classified into a negative class, but when the feature value is greater than the negative threshold value, the method proceeds to operation 504.

In operation 504, the feature value is compared with a jump threshold value. That is, when the feature value is greater than the jump threshold value, the method proceeds to operation 506, thereby jumping to an $i+2_{th}$ stage. In operation 504, when the feature value is smaller than the jump threshold value, the method proceeds to operation 508, thereby moving to an $i+1_{th}$ stage.

In operation 510, it is determined whether the stage to which the method has jumped or moved is a last stage. In the case where the stage is the last stage, the input image corresponding to the feature value is classified into a positive class. However, in the case where the stage is not the last stage, a classification operation in the $i+1_{th}$ stage or the $i+2_{th}$ stage is performed again.

Figure 6:
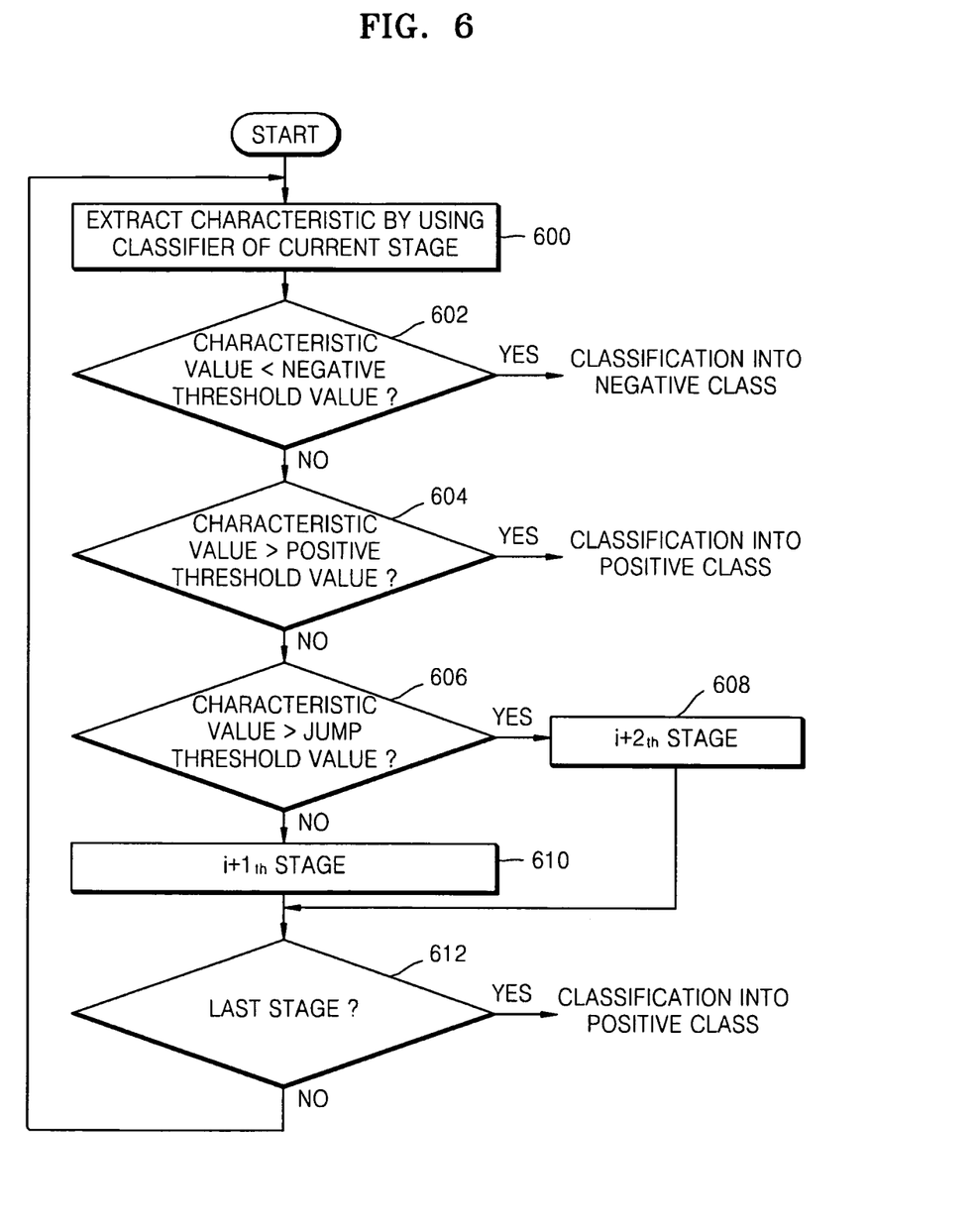
FIG. 6 illustrates a method of detecting an object using a multi-stage classifier as illustrated in FIGS. 4A through 4C, according to another embodiment of the present invention.

FIG. 6 illustrates a method of detecting an object using a multi-stage classifier, as illustrated in FIGS. 4A through 4C, according to another embodiment of the present invention.

Referring to FIG. 6, in operation 600, a feature is extracted using a classifier of a current stage, i.e., an $i_{th}$ stage. In operation 602, a feature value is calculated using the extracted feature, and the feature value is compared with a negative threshold value. That is, when the feature value is smaller than the negative threshold value, an input image corresponding to the feature value is classified into a negative class, but when the feature value is greater than the negative threshold value, the method proceeds to operation 604.

In operation 604, the feature value is compared with a positive threshold value. That is, when the feature value is greater than the positive threshold value, the input image corresponding to the feature value is classified into a positive class. However, when the feature value is smaller than the positive threshold value, the method proceeds to operation 606.

In operation 606, the feature value is compared with a jump threshold value. That is, when the feature value is greater than the jump threshold value, the method proceeds to operation 608, thereby jumping to an $i+2_{th}$ stage. In operation 606, when the feature value is smaller than the jump threshold value, the method proceeds to operation 610, thereby moving to an $i+1_{th}$ stage.

In operation 612, the method checks whether the stage to which the method has jumped or moved is a last stage. In the case where the stage is the last stage, the input image corresponding to the feature value is classified into the positive class. However, in the case where the stage is not the last stage, a classification operation in the i+1th stage or the i+2th stage is performed again.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device. Also, functional programs, codes, and code segments for accomplishing embodiments of the present invention may be easily construed by programmers of ordinary skill in the art to which the present invention pertains.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of detecting an object in an input image by using a multi-stage classifier, the method comprising:
    calculating, by way of a processor, a feature value based on features extracted from the input image using a classifier of an $i_{th}$ (i is a positive integer) stage, and comparing the calculated feature value with a first threshold value of the $i_{th}$ stage, and when the feature value is smaller than the first threshold value of the $i_{th}$ stage, classifying the input image into a non-object;
    comparing, when the feature value is greater than the first threshold value of the $i_{th}$ stage, the feature value with a second threshold value of the $i_{th}$ stage, and when the feature value is greater than the second threshold value of the $i_{th}$ stage, classifying the input image into an object;
    comparing, when the feature value is less than the second threshold value of the $i_{th}$ stage, the feature value with a third threshold value of the $i_{th}$ stage;
    when the feature value is greater than the third threshold value of the $i_{th}$ stage, jumping to a classifier of an $i+2_{th}$ stage without calculating the feature value in a classifier of an $i+1_{th}$ stage and when the feature value is smaller than the third threshold value of the $i_{th}$ stage, moving to the classifier of the $i+1_{th}$ stage and calculating the feature value in the classifier of the $i+1_{th}$ stage; and
    determining whether the object exists in the input image, based on a result of the classification performed by the object classification unit.

2. The method of claim 1, wherein the third threshold value of the $i_{th}$ stage is determined from a maximum value obtained by outputting negative samples, which are classified into the non-object in the $i+1_{th}$ stage, using the classifier of the $i_{th}$ stage.

3. The method of claim 1, wherein the second threshold value of the $i_{th}$ stage is determined from a maximum value obtained by outputting negative samples, which are classified into the non-object in the $i_{th}$ stage, using the classifier of the $i_{th}$ stage.

4. The method of claim 1, wherein the input image is divided into subwindows having a predetermined size and is input to the classifier of the $i_{th}$ stage.

5. The method of claim 1, wherein the object is a face.

6. The method of claim 1, further comprising:
    checking whether a current stage is a last stage; and when the current stage is the last stage according to a result of the checking, classifying the input image corresponding to the feature value into the object.

7. A non-transitory recording medium having recorded thereon a program for executing the method of claim 1 on a computer.

8. An object detection apparatus for detecting an object in an input image by using a multi-stage classifier, the object detection apparatus including a processor and comprising:
an object classification unit, controlled by the processor, comprising the multi-stage classifier which comprises:
a first portion of the multi-stage classifier to calculate a feature value based on features extracted from the input image using a classifier of an $i_{th}$ (i is a positive integer) stage, and to compare the calculated feature value with a first threshold value of the $i_{th}$ stage, and when the feature value is smaller than the first threshold value of the $i_{th}$ stage, to classify the input image into a non-object;
a second portion of the multi-stage classifier to compare, when the feature value is greater than the first threshold value of the $i_{th}$ stage, the feature value with a second threshold value of the $i_{th}$ stage and when the feature value is greater than the second threshold value of the $i_{th}$ stage, to classify the input image into an object; and
a third portion of the multi-stage classifier to compare, when the feature value is less than the second threshold value of the $i_{th}$ stage, the feature value with a third threshold value of the $i_{th}$ stage, and when the feature value is greater than the third threshold value of the $i_{th}$ stage, to jump to a classifier of an $i+2_{th}$ stage without calculating the feature value in a classifier of an $i+1_{th}$ stage, and when the feature value is smaller than the third threshold value of the $i_{th}$ stage, to move to the classifier of the $i+1_{th}$ stage to calculate the feature value in the classifier of the $i+1_{th}$ stage; and
a determination unit, controlled by the processor, determining whether the object exists in the input image, based on a result of the classification performed by the object classification unit.

9. The object detection apparatus of claim 8, wherein the third threshold value of the $i_{th}$ stage is determined from a maximum value obtained by outputting negative samples, which are classified into the non-object in the $i+1_{th}$ stage, using the classifier of the $i_{th}$ stage.

* * * * *